United States Patent
Gomez

(10) Patent No.: US 7,169,305 B2
(45) Date of Patent: Jan. 30, 2007

(54) ADVANCED LIQUID VORTEX SEPARATION SYSTEM

(76) Inventor: Rodolfo Antonio M Gomez, 25 Olde Coach Road, Urrbrae, 5064 (AU)

( * ) Notice: Subject to any disclaimer, the term of this patent is extended or adjusted under 35 U.S.C. 154(b) by 450 days.

(21) Appl. No.: 10/496,032

(22) PCT Filed: Nov. 26, 2002

(86) PCT No.: PCT/AU02/01590

§ 371 (c)(1),
(2), (4) Date: May 19, 2004

(87) PCT Pub. No.: WO03/045525

PCT Pub. Date: Jun. 5, 2003

(65) Prior Publication Data

US 2004/0256312 A1   Dec. 23, 2004

(30) Foreign Application Priority Data

Nov. 27, 2001   (AU) ..................... PR9120

(51) Int. Cl.
*B01D 19/00* (2006.01)
*B01D 45/12* (2006.01)
*B01D 17/038* (2006.01)
*B01D 21/26* (2006.01)
*B04C 3/00* (2006.01)

(52) U.S. Cl. ............... 210/512.3; 210/788; 210/188; 210/512.1; 209/722; 209/725; 96/155; 96/204; 55/394; 55/399; 55/406; 55/459.1; 55/459.3

(58) Field of Classification Search ............... 210/788, 210/188, 512.1, 512.3; 209/722, 725; 96/155, 96/204; 55/394, 399, 406, 459.1, 459.3
See application file for complete search history.

(56) References Cited

U.S. PATENT DOCUMENTS 3,895,930 A * 7/1975 Campolong ............... 55/394
5,062,955 A * 11/1991 Sciamanna ............. 210/512.1
6,827,862 B1 * 12/2004 Brockhoff et al. ....... 210/512.1

* cited by examiner

*Primary Examiner*—David A. Reifsnydre
(74) *Attorney, Agent, or Firm*—Klauber & Jackson

(57) ABSTRACT

A liquid vortex separator including a vortex tube (16) with an impeller (13) in the feed end to impart a rotational motion to liquid within the tube, a feed cylinder (12) connected to the vortex tube by a reducing cone (14). The separator has a separating cone (17) at the outlet end, an annular collecting ring (18) for heavy solids and a liquid discharge pipe extending axially from the separating cone. A feed tank (31) and circulating stream arrangement ensures operation of the system at varying feed rates. The liquid vortex separator may also be fitted with microwave generators (40), electrodes (51) powered from a DC source or magnets (60) to produce desired effects or chemical reactions in the material being processed through the liquid vortex separator.

24 Claims, 6 Drawing Sheets

ADVANCED LIQUID VORTEX SEPARATION SYSTEM

FIELD OF INVENTION

This invention relates to a liquid vortex separation system for the separation of solids and liquids, gas and liquids or liquids of different specific gravity.

BACKGROUND TO THE INVENTION

Comminution in the mineral processing industry consists of coarse and fine crushing followed by grinding in a ball mill and size separation by pump and hydrocyclone. This conventional method of size separation requires a pump and hydrocyclone to carry out the separation. This method consumes a high amount of energy and wear on the pump. U.S. Pat. Nos. 4,555,253 and 4,475,932 of Hull, et al (Nov. 16, 1985 and Oct. 9, 1984) describe a gas-liquid separation system using a circulating pump and creating a vortex in the separator.

The liquid vortex separator introduces the separating force directly into one unit. Rotational motion is imparted to the feed liquid by an impeller at the feed end of the tube and the light and heavy products are collected at the discharge end. The impeller is simple in construction and clearances required are less critical than in a slurry pump, making the liquid vortex separator requiring less maintenance resulting in a more reliable unit.

PRIOR ART

A conventional liquid vortex separator is shown on FIG. 1. It is basically a cylinder 1 with an impeller 2 and feed inlet 3 at one end and a conical separator tube 4 at the other end where the separated products are discharged. The impeller imparts a rotating motion to the feed slurry and this rotating motion continues as the slurry travels towards the discharge end. The heavier solid particles or liquid 6 are thrown to the outside of the cylinder 1 and separating cone 4 while lighter liquids or gas 8 concentrate at the inner part of the cylinder and cone. The heavier fraction 6 is collected in an annular ring and discharged through a pipe 5. The lighter fraction 8 at the inner portion of the separating cone is collected and discharged by a pipe 7.

Applicant has devised improvements on the conventional liquid vortex separator with intensified vortex forces.

DESCRIPTION OF THE INVENTION

In one form therefore the invention is said to reside in a liquid vortex separator including a vortex tube with a feed end and an outlet end, an impeller in the feed end to impart a rotational motion to liquid within the tube, a feed inlet adjacent to the feed end, a separating cone at the outlet end, an annular collecting ring in the separating cone, a heavy solids outlet from the separating cone and a liquid discharge pipe extending axially from the separating cone, characterised by a feed cylinder of larger diameter than the vortex tube at the feed end, the feed cylinder being connected to the vortex tube by a reducing cone and the impeller and the feed inlet being in the feed cylinder.

Preferably the feed end inlet feeds tangentially into the feed cylinder.

The impeller may have three or more vanes connected by spokes or circular plate to a drive shaft and the vanes of the impeller may be oriented or shaped so as to impart a motion to the feed material in the direction of discharge end of the liquid vortex separator.

The slope of the reducing cone may be proportional or hyperbolic in shape and the angle of the wall of the reducing cone can be in the range of 45 to 10 degrees to the longitudinal axis of the vortex tube.

The slope of the separating cone may be proportional or hyperbolic in shape and the slope of the separating cone can be in the range of 45 to 10 degrees to the longitudinal axis of the vortex tube.

The discharge end of the separating cone terminates in a dosed cylinder concentric with the separating cone to collect the heavy solid particles or heavy liquid into a discharge pipe.

There can be further included an open cylinder at the discharge end of the separating cone whereby to collect middlings into a middling discharge pipe.

The liquid discharge pipe can be flared at its feed end and is located in and concentric with the separating cone to collect light liquid fractions or gas and to discharge them from the liquid vortex separator.

The annular cylinder collecting heavy fractions and the cylinder collecting the middlings may be adjustable in position along the axis of the separating cone. Adjustment of the position of the annular cylinder can be by means of a screw or hydraulic system.

There can be further included a feed tank to enable a constant supply to be supplied to the liquid vortex separator. The feed tank can include an agitator and a baffled compartment to receive light product from the liquid vortex separator and a bottom discharge to the liquid vortex separator.

The feed tank may also include provision for addition of reagents and also for heating or cooling. Heating or cooling may also be added to the liquid vortex separator.

There can be further included at least one microwave generator adapted to feed microwave entry at several points in the separating cylinder. Microwave energy can be provided a frequency from 800 to 22,000 megahertz and is delivered to the separating cone via a wave guide and a microwave window or via co-axial cable and antennae.

There can be further included means to apply magnetic energy to the vortex tube. The magnetic energy can be applied by an electromagnet or a permanent magnet.

There can be further included means to apply unipolar activation to the interior of the vortex tube.

Hence it will be seen that the various embodiments of the invention consist generally of one or more of three parts as follows:
- Modifications to the liquid vortex separator to improve its separating efficiency, and
- A feed tank to ensure the continuous efficient operation of the liquid vortex separator and
- Fitting the liquid vortex separator with microwave generators, or with electrodes, or with magnets to carry out certain specific functions.

BRIEF DESCRIPTION OF THE DRAWINGS

A description of the invention is given below referring to diagrams to accurately describe the embodiments of the invention.

In the drawings.

DESCRIPTION OF PREFERRED EMBODIMENT

Figure 1:
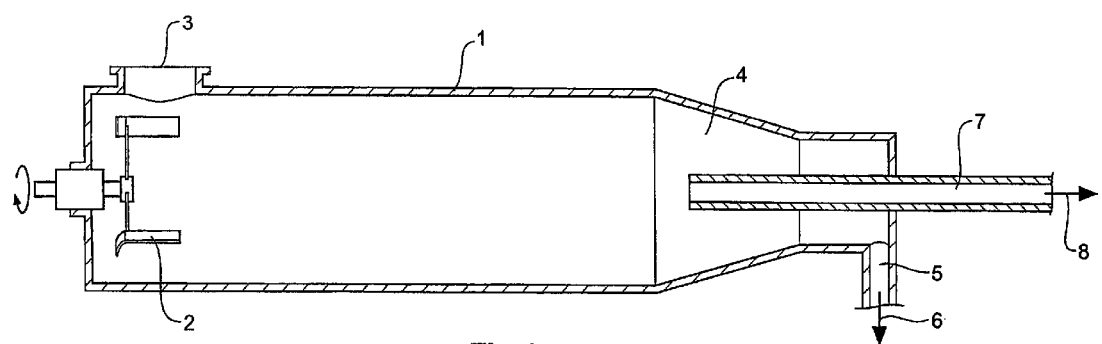
FIG. 1 shows a prior art vortex separator.
Figure 2:
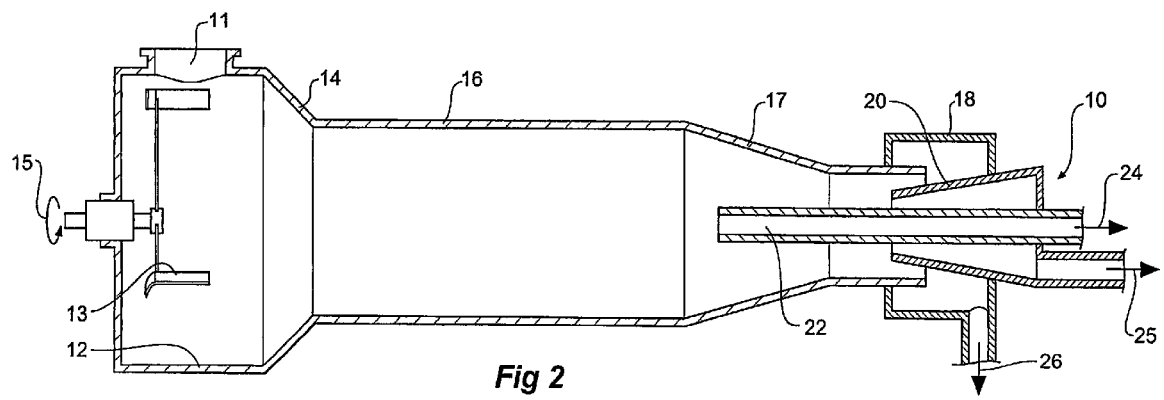
FIG. 2 shows a first embodiment of liquid vortex separator according to the invention.

FIG. 2 is a diagram describing the advanced liquid vortex separator according to one embodiment of the present invention.

The basic components of this vortex separator are the drive 15 providing rotational motion to the impeller 13 located in a feed cylinder 12, a reducing cone 14 between the feed cylinder 12 and a separating cylinder 16, a separating cone 17 and a means of discharging the separated products generally shown as 10. FIG. 2 shows the vortex separator in the horizontal position but it may also be oriented in a vertical or inclined position.

Figure 4:
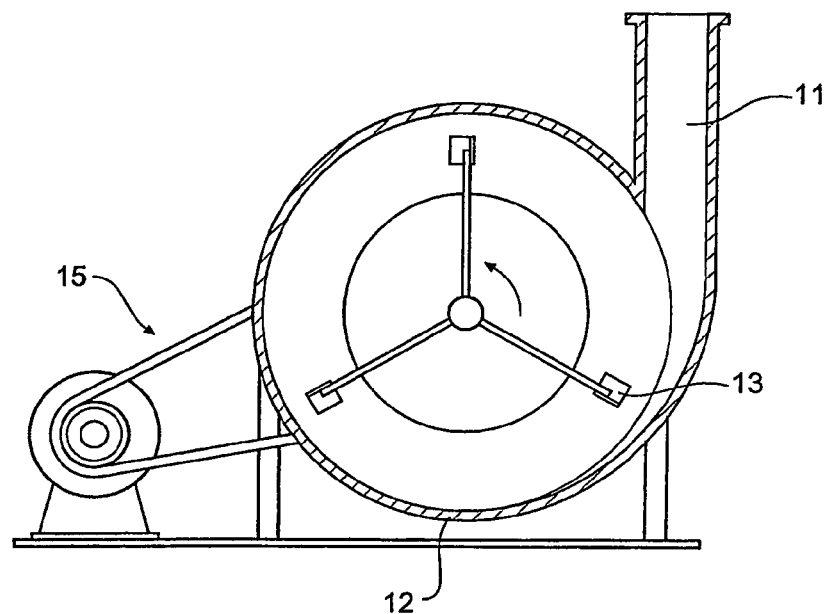
FIG. 4 shows a cross sectional view of the inlet end of the vortex separator shown in FIG. 2

Feed that may be a mixture of liquid and fine solid, or liquids of different specific gravity or a mixture of gas and liquid is introduced into the feed inlet 11 and guided to a tangential entry into the feed cylinder as shown in more detail in FIG. 4. The feed cylinder may have a diameter of 150 to 1,500 millimeters or more depending on the nature of the application and the capacity required. The impeller 13 gives the feed slurry a rotational motion. The impeller consists of three or more vanes connected by spokes to the drive shaft. Alternatively, the vanes may be connected to a circular plate close to the rear of the cylinder that is connected to the drive shaft. The vanes are oriented or shaped so that they impart a motion to the slurry in the direction of the discharge end. The rotation speed of the slurry is increased as it passes through the reducing cone 14. The slope of the reducing cone may be as high as 45 degrees to the longitudinal axis of the separating cylinder to as low as 10 degrees to the longitudinal axis of the separating cylinder. The separating cylinder allows for more separation of the components of the slurry. The length of the separating cylinder 16 can vary depending on if the solid is coarse and heavy requiring a short length or none at all to a long length if the solids are fine and have a low difference in specific gravity to the liquid it is carried in.

The slurry subsequently transfers from the separating cylinder 16 to the separating cone 17 where more intense separating forces are applied. The slope of the separating cone 17 may be as high as 45 degrees to the horizontal to as low as 10 degrees to the longitudinal axis of the separating cylinder. Generally, coarse particle separation is favored by a sharp angle such as 35 degrees while fine particle separation is favored a flatter angle such as 15 degrees.

Figure 3:
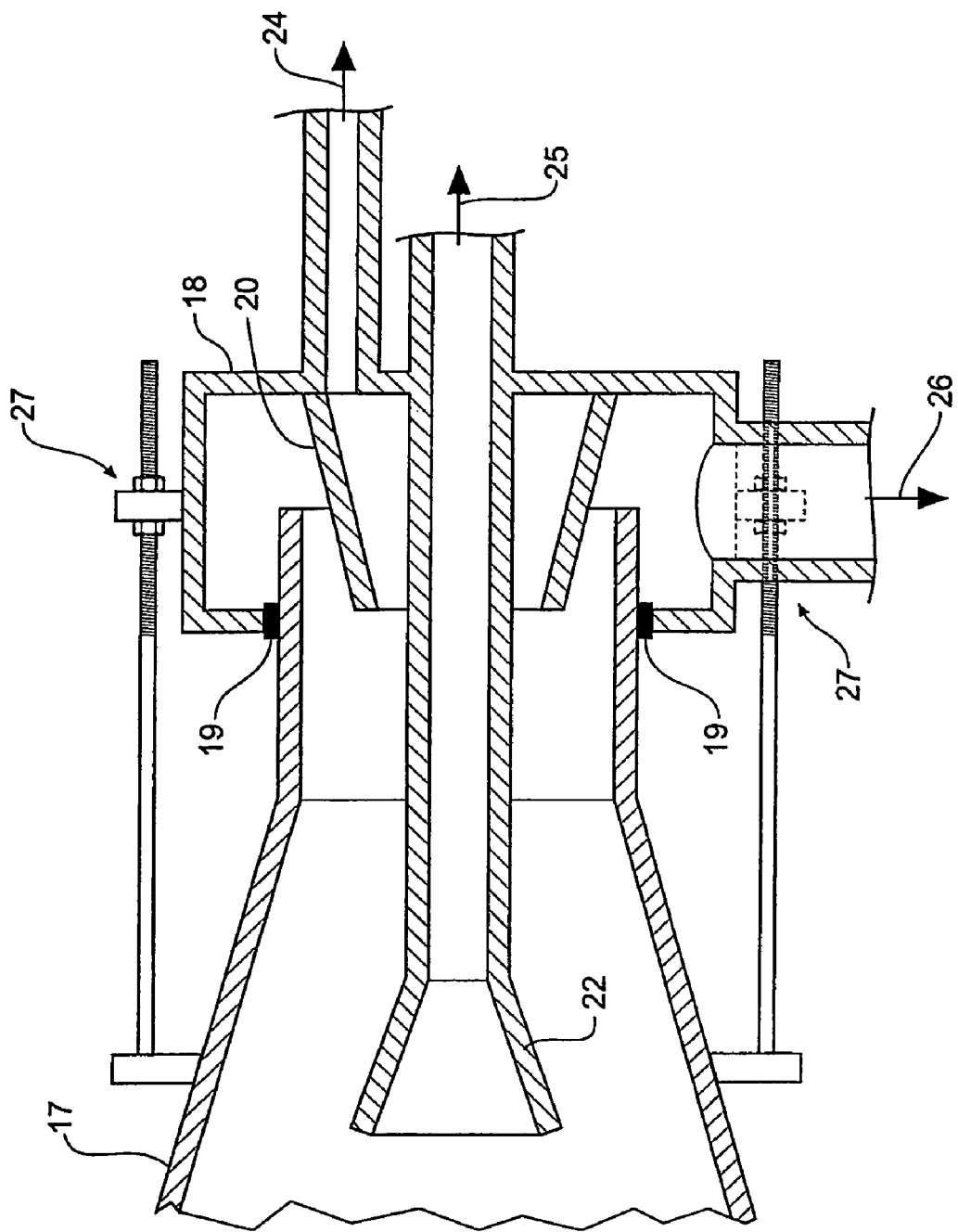
FIG. 3 shows an alternative embodiment of the discharge end of the vortex separator according to this invention.

Products are collected and discharged separately at the end of the separating cone in at least two separate fractions. The heaviest and coarsest particles 26 are collected in an annular ring 18, the middlings 25 are collected in another annular ring 20 which is within the annular ring 18 and the liquid with very fine solids 24 are collected by pipe 22. Pipe 22 may be an ordinary pipe but it may also be flared at the feed end as shown in FIG. 3. Pipe 22 may also be adjustably mounted so that it can be moved further into or out of the separating cone 17. For some separation systems the use of the annular ring 20 to collect the middlings 25 may not be necessary.

FIG. 3 shows an alternative embodiment of the discharge end of the vortex separator according to this invention In this embodiment the annular collecting ring 20 is connected to outer annular ring 18 and both may be moved further into or out of the separating cone 17 through an adjustable arrangement consisting of screws or hydraulics 27 and sliding seals 19. This allows the cut between middlings 25 and heavy coarse particles 26 to be varied during the operation of the liquid vortex separator. This adjustment may be made automatically during operation by measuring the density of the heavy fraction 26. The speed of the drive 15 for the impeller 13 may also be varied to maintain the desired properties of the heavy coarse particles 26.

Cooling and heating including the provision of insulation onto the external surfaces of the liquid vortex separator may be provided.

The components of the liquid vortex separator may be made of the appropriate materials or provided with protective coating such as natural and synthetic rubber and plastics such as Teflon and polyurethane to meet various applications that are abrasive and corrosive.

It has been found that the liquid vortex separator will operate more efficiently if a constant rate of feed volume is achieved. This may be achieved in this invention by the arrangement shown in FIG. 5.

Figure 5:
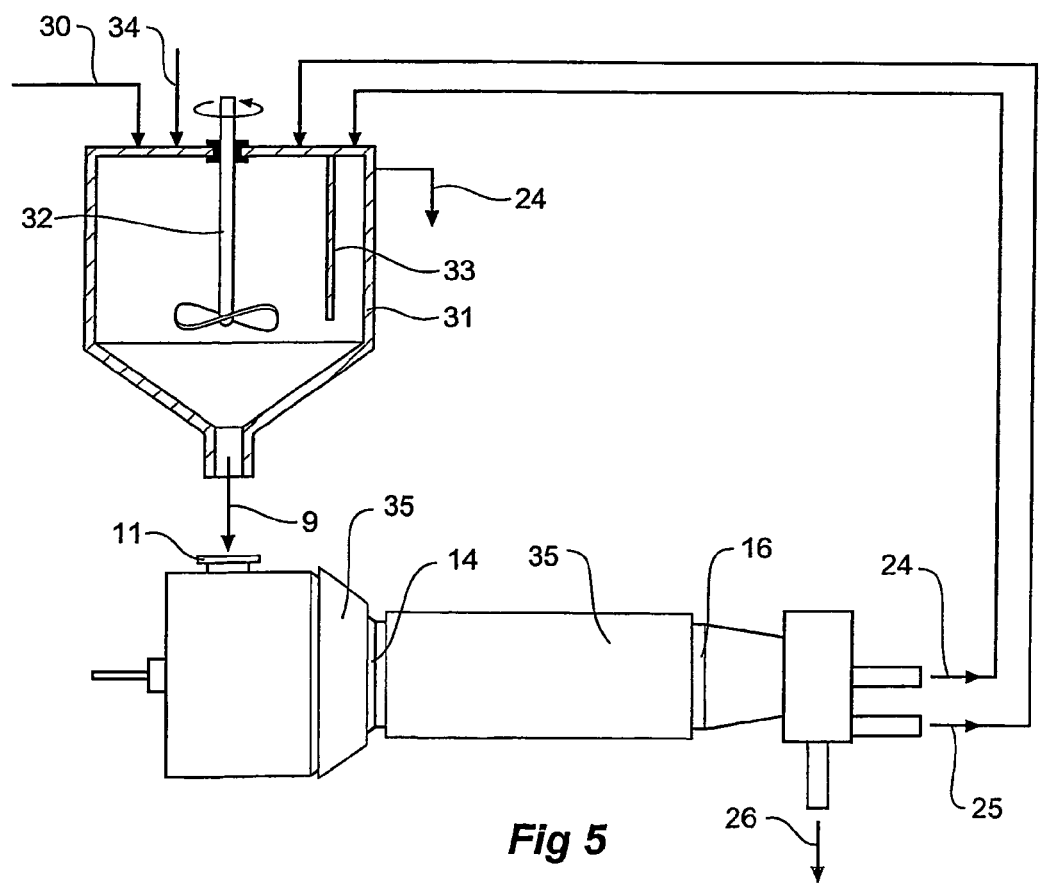
FIG. 5 shows a schematic flow diagram for a liquid vortex separation system according to the invention.

FIG. 5 shows a schematic flow diagram for a liquid vortex separation system according to the invention and includes a feed tank 31 fitted with a baffle 33 and the system involves circulating the middlings and light stream products from the liquid vortex separator. Raw waste or feed slurry 30 is fed into the feed tank 31 fitted with or without an agitator 32. Middlings 25 from the vortex separator are circulated to the feed tank 31 with or without the aid of a pump. Reagents 34 may be added to the feed tank. The mixed slurry 9 is fed into the vortex liquid separator inlet 11. The thick slurry 26 is the final product for the next stage of processing such as filtration or microwave drying. The light product stream 24 is returned to baffled section of the fed tank with or without the aid of a pump where part of it is recycled to the liquid vortex separator and the rest is discharged from the feed tank as the relatively clear product 24. By the use of the feed tank 31 the liquid vortex separator will function efficiently even if there is a variation in the feed rate of the raw feed 30.

In the operation of the liquid vortex system, the light fraction or the heavy fraction from the first liquid vortex system may be the feed to another vortex system to achieve the desired result for a particular application.

Reagents 34 may be added in the feed tank 31 to flocculate the solids or to create certain effects or chemical reactions in the liquid vortex separator.

Jackets 35 may be placed around the reducing cone 14 and separating cylinder 16 as well as to other components of the separator to provide heating, cooling or insulation as required for specific processes.

Figure 6:
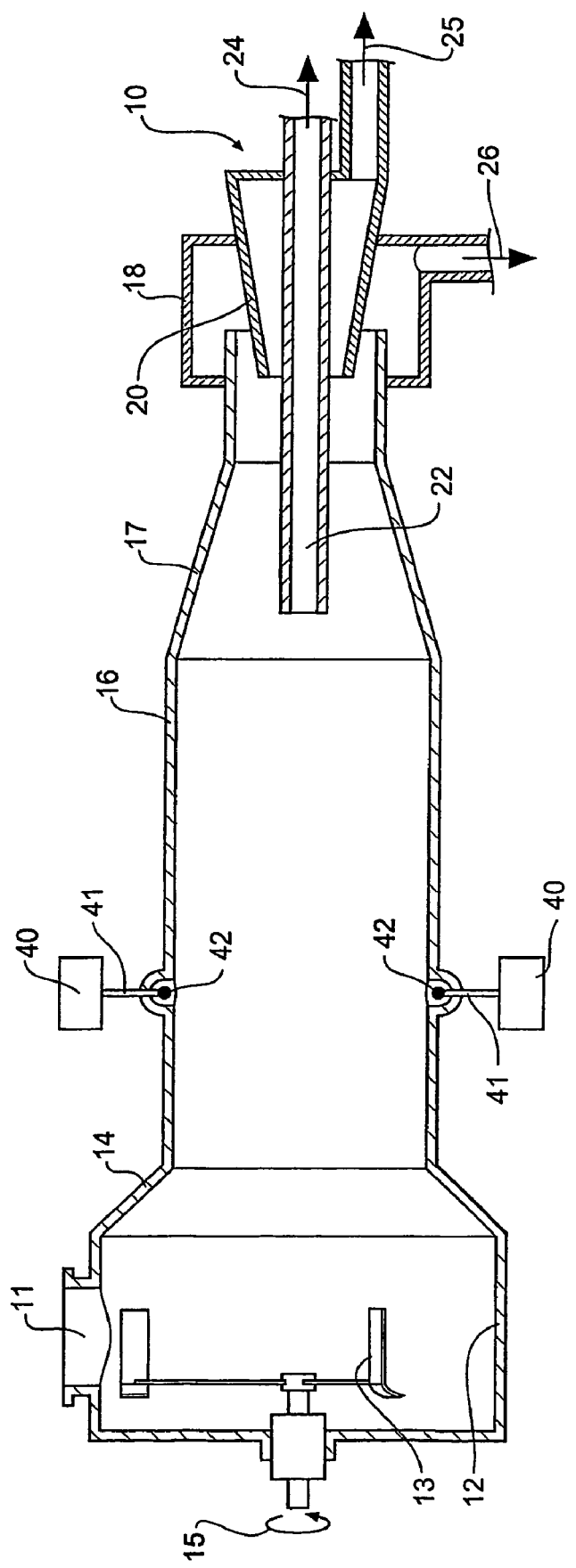
FIG. 6 shows an improvement to the liquid vortex separator of FIG. 2 according to another aspect of the invention.

FIG. 6 is a diagram showing the liquid vortex separator fitted with means for microwave energy to be introduced into the separating cylinder. The magnetron 40 generates the microwave that are transmitted by a co-axial cable or microwave guide 41 to a microwave antennae or window 42 into the separating cylinder 16 of the liquid vortex separator.

Figure 7:
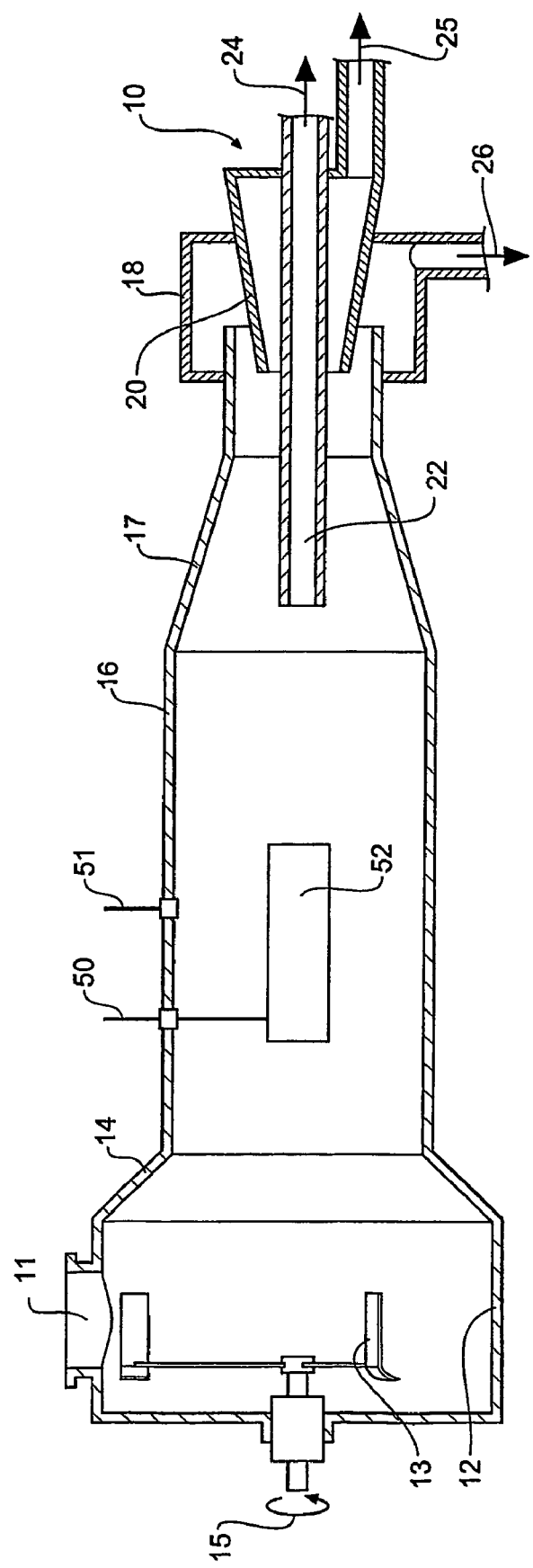
FIG. 7 shows an alternative improvement to the liquid vortex separator of FIG. 2 according to another aspect of the invention.

FIG. 7 is a diagram showing electrodes fitted to the liquid vortex separator. The function of these electrodes is to remove anode or add cathode electrons to the liquid or substances in the liquid in accordance with our U.S. Pat. No. 5,882,502 to produce a desired effect or chemical reaction. The solution electrode cylinder 52 is connected to lead 50 connected to the solution electrode of the anode or cathode. The separating cylinder 16 is a conductor and becomes the anode or cathode connected to the lead 51. The electrodes are therefore adapted to provide unipolar activation to the liquid passing through the liquid vortex separator.

Figure 8:
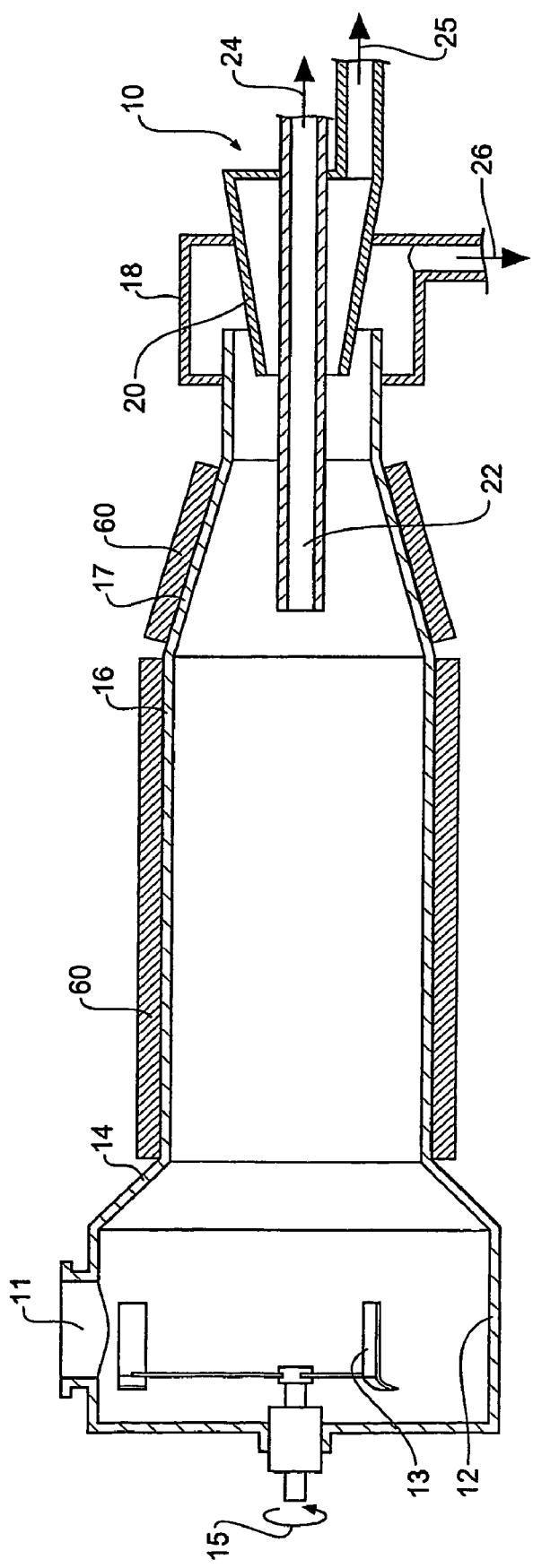
FIG. 8 shows another improvement to the liquid vortex separator of FIG. 2 according to another aspect of the invention.

FIG. 8 is a diagram showing magnets fitted outside of the separating cylinder 16 and separating cone 17. The separating cylinder and separating cone must be made of material that allows magnetic forces to pass with minimum resistance. The magnets 60 may be permanent magnets or electromagnets and are arranged so that there are two or more sets along the circumference of the separating cylinder 16 and the separating cone 17.

These accessories of the liquid vortex separator are aimed at using the liquid vortex separator in the processing and purification of liquids.

The invention claimed is:

1. A liquid vortex separator including a vortex tube with a feed end and an outlet end, an impeller in the feed end to impart a rotational motion to liquid within the vortex tube, a feed inlet adjacent to the feed end, a separating cone at the outlet end, an annular collecting ring in the separating cone, a heavy solids outlet from the separating cone and a liquid discharge pipe extending axially from the separating cone, characterised by a feed cylinder of larger diameter than the vortex tube at the feed end, the feed cylinder being connected to the vortex tube by a reducing cone and the impeller and the feed inlet being in the feed cylinder.

2. A liquid vortex separator as in claim 1 wherein the feed end inlet feeds tangentially into the feed cylinder.

3. A liquid vortex separator as in claim 1 wherein the impeller has three or more vanes connected by spokes or circular plate to a drive shaft.

4. A liquid separator as in claim 3 wherein the vanes of the impeller are oriented or shaped so as to impart a motion to the feed material in the direction of discharge end of the liquid vortex separator.

5. A liquid vortex separator as in claim 1 wherein the slope of the reducing cone is proportional or hyperbolic in shape.

6. A liquid vortex separator as in claim 1 wherein the angle of the wall of the reducing cone is in the range of 45 to 10 degrees to the longitudinal axis of the vortex tube.

7. A liquid vortex separator as in claim 1 wherein the slope of the separating cone is proportional or hyperbolic in shape.

8. A liquid vortex separator as in claim 1 wherein the slope of the separating cone is in the range of 45 to 10 degrees to the longitudinal axis of the vortex tube.

9. A liquid vortex separator as in claim 1 wherein the discharge end of the separating cone terminates in a closed cylinder concentric with the separating cone to collect the heavy solid particles or heavy liquid into a discharge pipe.

10. A liquid vortex separator as in claim 1 further including an open cylinder at the discharge end of the separating cone whereby to collect middlings into a middling discharge pipe.

11. A liquid vortex separator as in claim 1 wherein the liquid discharge pipe is flared at its feed end and is located in and concentric with the separating cone to collect light liquid fractions and to discharge them from the liquid vortex separator.

12. A liquid vortex separator as claim 1 wherein the annular cylinder collecting heavy fractions and the cylinder collecting the middlings are adjustable in position along the axis of the separating cone.

13. A liquid vortex separator as in claim 12 wherein the adjustment of the position of the annular cylinder is by means of a screw or hydraulic system.

14. A liquid vortex separator as in claim 1 further including a feed tank to enable a constant supply to be supplied to the liquid vortex separator.

15. A liquid vortex separator as in claim 14 wherein the feed tank includes an agitator and a baffled compartment to receive light product from the liquid vortex separator and a bottom discharge to the liquid vortex separator.

16. A liquid vortex separator as in claim 14 wherein the feed tank includes a reagent addition arrangement.

17. A liquid vortex separator as in claim 16 wherein the microwave energy is provided at a frequency from 800 to 22,000 megahertz and is delivered to the separating cone via a wave guide and a microwave window or via co-axial cable and antennae.

18. A liquid vortex separator as in claim 14 wherein the feed tank includes an arrangement to add heating and cooling.

19. A liquid vortex separator as in claim 1 further including at least one microwave generator adapted to feed microwave entry at several points in the separating cylinder.

20. A liquid vortex separator as in claim 1 further including means to apply magnetic energy to the vortex tube.

21. A liquid vortex separator as in claim 20 wherein the magnetic energy is applied by an electromagnet.

22. A liquid vortex separator as in claim 20 wherein the magnetic energy is applied by a permanent magnet.

23. A liquid vortex separator as in claim 1 further including means to apply unipolar activation to the interior of the vortex tube.

24. A liquid vortex separator as in claim 1 further including an arrangement to add heating and cooling to the separating cylinder.

* * * * *